United States Patent
Chou et al.

(10) Patent No.: US 8,670,423 B2
(45) Date of Patent: Mar. 11, 2014

(54) AUTOMATIC PARTNER SELECTION IN THE COOOPERATIVE MAC PROTOCOL

(75) Inventors: Chun-Ting Chou, Briarcliff Manor, NY (US); Monisha Ghosh, Chappaqua, NY (US); Jun Yang, Croton-on-Hudson, NY (US)

(73) Assignee: Koninklijke Philips N.V., Eindhoven (NL)

( * ) Notice: Subject to any disclaimer, the term of this patent is extended or adjusted under 35 U.S.C. 154(b) by 815 days.

(21) Appl. No.: 12/441,625

(22) PCT Filed: Sep. 27, 2007

(86) PCT No.: PCT/IB2007/053932
§ 371 (c)(1),
(2), (4) Date: Mar. 17, 2009

(87) PCT Pub. No.: WO2008/038247
PCT Pub. Date: Apr. 3, 2008

(65) Prior Publication Data
US 2010/0020739 A1 Jan. 28, 2010

Related U.S. Application Data

(60) Provisional application No. 60/827,459, filed on Sep. 29, 2006.

(51) Int. Cl.
*H04W 4/00* (2009.01)
(52) U.S. Cl.
USPC ........... 370/338; 370/252; 370/315; 370/445; 370/461; 370/462
(58) Field of Classification Search
USPC .................. 370/445–462, 252, 315, 338
See application file for complete search history.

(56) References Cited

U.S. PATENT DOCUMENTS

| | | | | |
|---|---|---|---|---|
| 7,577,124 B2* | 8/2009 | Yomo et al. | | 370/338 |
| 7,606,182 B2* | 10/2009 | Park et al. | | 370/279 |
| 7,760,649 B2* | 7/2010 | Song | | 370/238 |
| 2008/0123574 A1* | 5/2008 | Sandhu et al. | | 370/311 |
| 2008/0285480 A1* | 11/2008 | Panwar et al. | | 370/253 |
| 2008/0310348 A1* | 12/2008 | Nandagopalan et al. | | 370/328 |

OTHER PUBLICATIONS

Chun-Ting Chou et al., "Cooperative Mac protocol with Automatic Relay Selection in Distributed Wireless Networks", Pervasive Computing and Communications Workshops, 2007, PERCOM Workshops, '07 Fifth Annual IEEE International Conference on, IEEE, PI, Mar. 2007, pp. 526-531, XP021070512.

(Continued)

*Primary Examiner* — Christopher Grey
(74) *Attorney, Agent, or Firm* — Larry Liberchuk (57) ABSTRACT

The present invention provides a system (600), device (500) and method (400) for automatic partner selection in an existing Cooperative MAC (CMAC) protocol, which uses the Ready-to-Send (RTS), Clear-to-Send (CTS) and Partner-Clear-to-Send (PCTS) handshaking to establish cooperation. The present invention enables a "best" partner/relay (500.R.k) who is also willing to cooperate to relay information to a destination (500.D.J) for the transmitting device (i.e., the source), without the source (500.S.i) making a decision on partner selection. That is, the present invention provides a new mechanism by which the best partner/relay (500.R.k) that is also willing to cooperate will "step in" automatically without the source's involvement in selection of the partner/relay (500.R.k). This mechanism is contention-based and the partner is "selected" using local information only in a fully distributed manner.

17 Claims, 6 Drawing Sheets

(56) References Cited

OTHER PUBLICATIONS

Liu Pei et al., "Cooperative Wireless Communications: A Cross-Layer Approach", Database Compendex Engineering Information, Inc., NY, Aug. 31, 2006, IEEE Wireless Communication, vol. 13, No. 4, Aug. 2006, pp. 84-92, XP002472967.

Yan Chen et al., Power-Aware Cooperative Relay Selection Strategies in Wireless Ad Hoc Networks, Database INSPEC, The Institution of Electrical Engineers, Stevenage, GB, 2006 IEEE, 2006 IEEE 17th International Symposium on Personal, Indoor and Mobile Radio Communications (PIMRC'06), Sep. 2006, Helsinki, Finland, pp. 5, XP002472966.

A. Bletsas et al., "A Simple Distributed Method for relay Selection in Cooperative Diversity Wireless Networks, based on Reciprocity and Channel Measurements", Vehicular Technology Conference, 2005, VTC 2005-Spring, 2005 IEEE 62st Stockholm, IEEE May 30, 2005, pp. 1484-1488, XP010855669.

\* cited by examiner

AUTOMATIC PARTNER SELECTION IN THE COOOPERATIVE MAC PROTOCOL

This invention relates to automatic partner selection in a new Cooperative MAC (CMAC) protocol, which uses the Ready-to-Send (RTS), Clear-to-Send (CTS) and Partner-Clear-to-Send (PCTS) handshaking to establish cooperation.

In a cooperative wireless network, a transmitting device (i.e., the source) relies on a partner (i.e., the relay) to transmit partial/complete information to the receiving device (i.e., the destination). This way, the destination receives the information from two devices, namely the source and the relay, via two different wireless links/paths, thus incurring a so-called spatial diversity gain. In order to maximize the diversity gain, the selection of a good partner is crucial to the performance of the cooperative wireless network.

Figure 1:
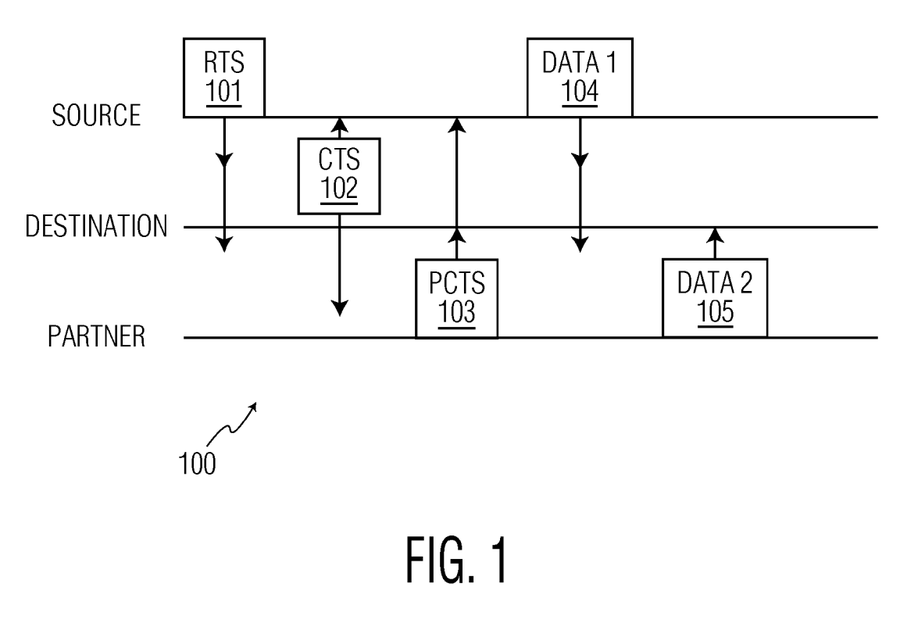
FIG. 1 illustrates the CMAC protocol based on RTS/CTS/PCTS handshaking.

The IEEE 802.11 family of protocols uses the Request to Send (RTS) and Clear to Send (CTS) to reserve the channel and prevent a hidden node problem. In a cooperative MAC (CMAC) protocol, the cooperation is established among the source, relay and destination via a RTS/CTS/PCTS handshaking procedure. First, the source sends a RTS frame to the destination. Following receipt of this RTS frame, the destination replies with a CTS frame to the source. In order to inform both the source and destination that some relays may be willing to help as a partner, the preferred partner also sends a PCTS following the CTS frame. These handshaking frames also reserve the wireless channel for the data transmission. The timeline for this handshaking procedure is illustrated in FIG. 1.

Figure 2:
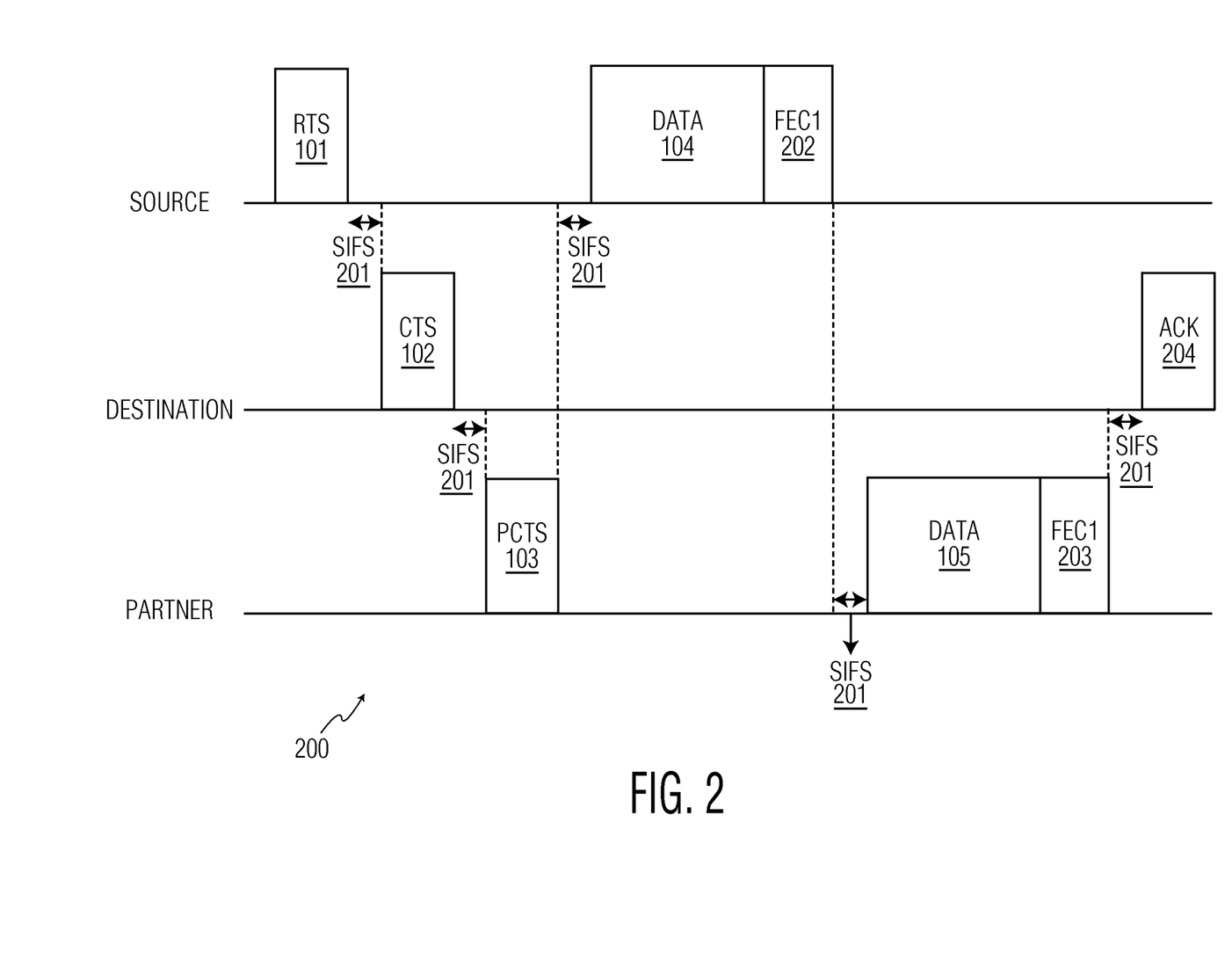
FIG. 2 Basic scheme for Cooperative Communications.

In order to enable cooperation in the existing IEEE 802.11 networks, the RTS frame 101 is modified to include the address of the partner apart from the source and the destination addresses. Upon receiving the RTS the destination sends a CTS 102 and then the partner sends a Partner Clear to Send (PCTS) 103. Then the source sends (partial) data 104 along with the Forward Error Control (FEC) 202 (e.g., Reed Solomon Coding) to both the relay and receiver. The destination receives the data frame 104 with the FEC 202 but does not respond with an ACK immediately. Instead, the destination waits for the partner to transmit a second part of the data 105 with a new FEC 203 or the same FEC that was sent by the source. All transmissions are preceded by the SIFS time 201 to take into account the transmitter/receiver turnaround time that is governed by the PHY being used. All other devices use the Network Allocation Vector (NAV) updated by the "duration" filed of the received frames (i.e., RTS, CTS. Or PCTS) to defer their transmission Devices that can listen to the source set their NAVs governed by the duration field specified in the RTS 101, and devices listening to the destination set their NAVs by the duration field specified in the CTS 102. Devices who listen to a partner set their NAVs specified by the duration field specified in PCTS 103.

If the CTS 102 fails then the CMAC protocol is similar to the IEEE 802.11 protocol and the rules and regulations that apply to IEEE 802.11 apply to CMAC.

Figure 3:
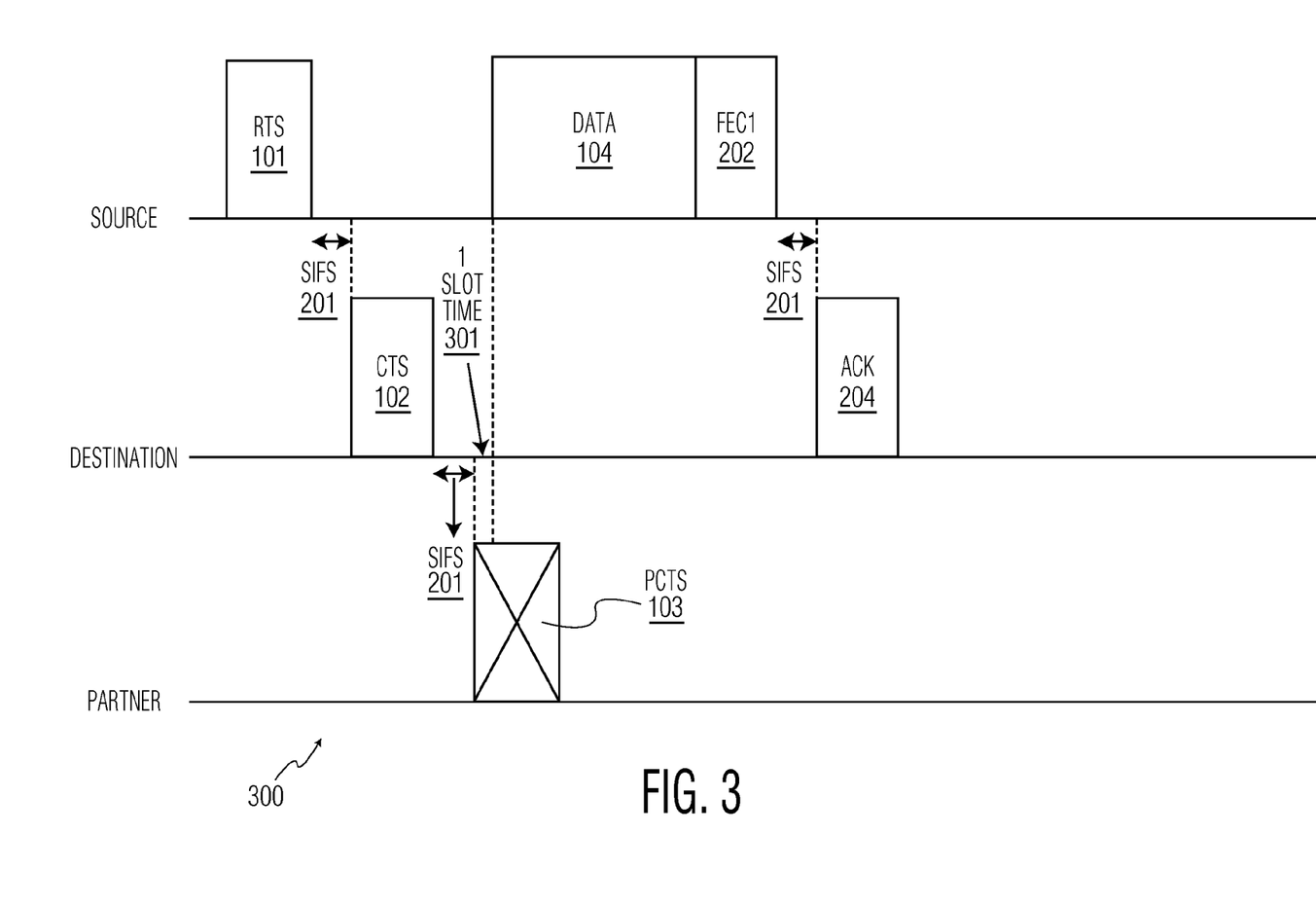
FIG. 3 illustrates PCTS failure where the sender waits for SIFS+aSlotTime and transmits the data to the receiver and the receiver responds with an ACK.

If the PCTS 103 transmission fails, then the source sends its data frame 104 at SIFS plus an extra timeout 301 to the destination. Note that 1 slot time 301 is shown in FIG. 3 as a timeout example. In doing so, the source reflects the new duration field so that the medium becomes usable immediately by the devices that are hidden from both the partner and receiver. This scenario is illustrated in FIG. 3.

In general, a source should choose a relay as its partner based on information such as link quality between source and relay, relay and destination, and source and destination or network topology. However, even given a best partner choice by a source, the partner may not really be the best choice because the decision-making at the source may not be made with complete knowledge available. This situation needs to be remedied to incorporate partners in the decision-making process.

The present invention provides a system, apparatus, and method for automatic partner selection in an existing Cooperative MAC (CMAC) protocol, which uses the Ready-to-Send (RTS), Clear-to-Send (CTS) and Partner-Clear-to-Send (PCTS) handshaking to establish cooperation. The present invention enables a "best" partner who is also willing to cooperate to relay information for the transmitting device (i.e., the source), without the source making a decision on partner selection.

That is, the present invention provides a new mechanism by which the best relay that is also willing to cooperate will "step in" automatically without the source's involvement in selection of the partner.

This mechanism is contention-based and the partner is "selected" using local information only in a fully distributed manner.

It is to be understood by persons of ordinary skill in the art that the following descriptions are provided for purposes of illustration and not for limitation. An artisan understands that there are many variations that lie within the spirit of the invention and the scope of the appended claims. Unnecessary detail of known functions and structure may be omitted from the current descriptions so as not to obscure the present invention.

Instead of letting a source select a partner, the present invention provides a system, apparatus, and method that enable candidate relays to decide whether or not to cooperate with the source and its destination. It should be noted that only those candidate relays that can hear both the source and destination (i.e., in both devices' neighborhood) are "good" candidates for being a partner. Since the source may not have full neighborhood information of the intermediate relays, it makes sense for the intermediate relays to decide whether or not to cooperate based on their local information.

Figure 4:
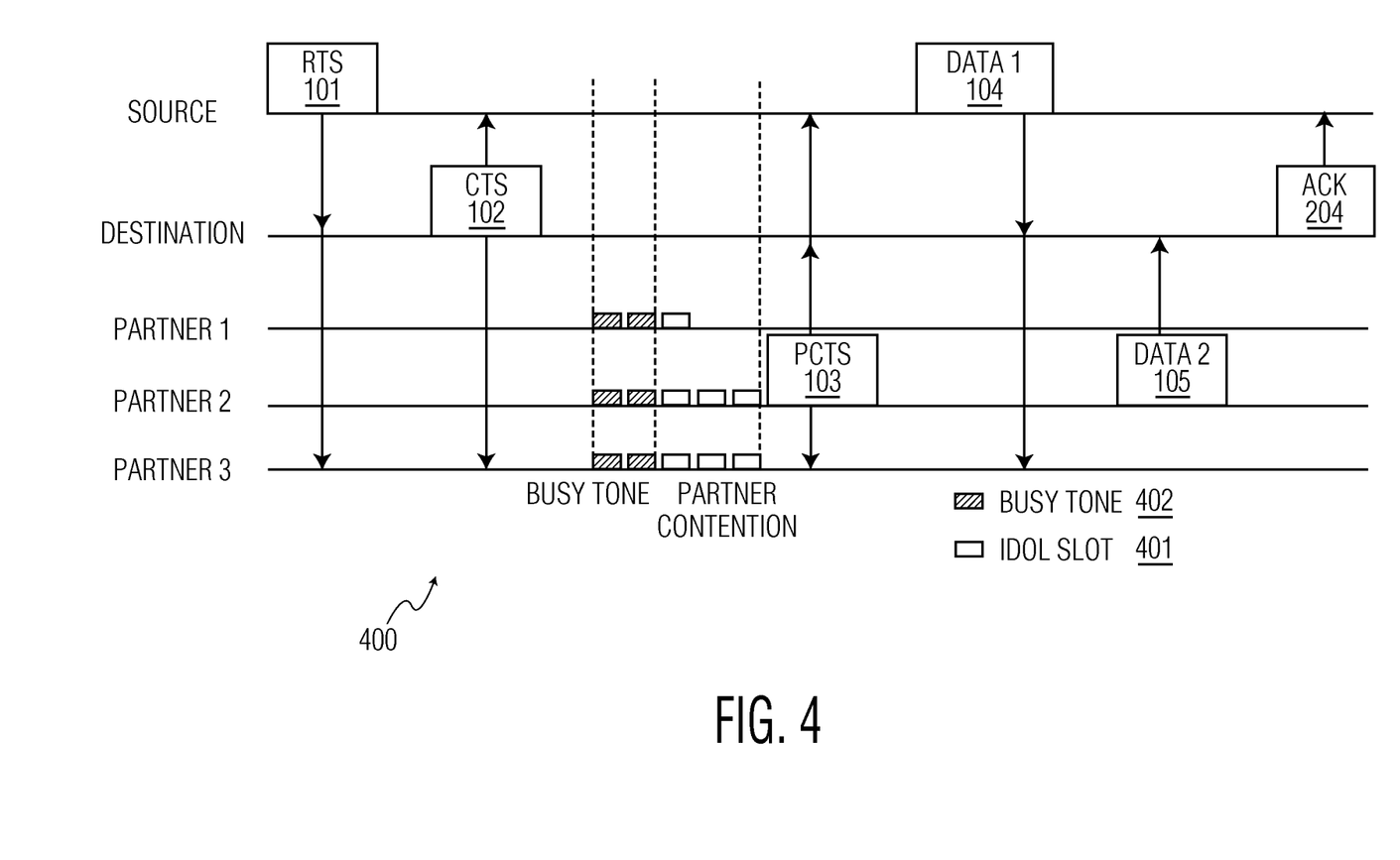
FIG. 4 illustrates automatic partner selection, according to the present invention.

The method of the present invention is illustrated in FIG. 4 and includes the following steps:

1. The source sending a RTS frame 101;
2. The destination sending a CTS frame 102 including link information between the source and destination (obtained from the RTS frame 101 of step 1);
3. Each relay that receives both an RTS 101 and a CTS frame 101, performing the steps of:
   a. Calculating/estimating the quality of links between the source and itself (based on the received RTS frame 101) and between the destination and itself (based on the received CTS frame 102),
   b. Based on the calculated link quality and the link information included in the CTS frame 102, rating itself (excellent, good, bad) for the purpose of being a partner, c. If the relay is self-rated "excellent" and "good", respectively transmitting a busy tone for two slots and one slot before contending for transmitting a PCTS frame 103, otherwise, the relay keeps silent, and d. A relay that does not hear a transmitted busy tone 402 performing the steps of
  backing off for a randomly selected number of slots between 1 and N, and
  contending for transmitting the PCTS frame (103);

4. If the source does not hear any busy tone 402 SIFS (short inter frame space)+one slot time after the reception of the CTS frame 102, conducting transmission as in a non-cooperative scenario based on an assumption that there is no partner;

5. If the source correctly receives a frame after reception of any busy tone 402, the source proceeding with the sender (relay) of the PCTS frame 103 as a partner;

6. If the source receives a frame with errors after reception of any busy tone 402, the source proceeding as in a non-cooperative scenario indicating the cancellation of cooperative transmission in both RTS 103 and DATA 104 frames sent by the source;

7. The relay only participating in the cooperative transmission when the source indicates the need of a cooperation transmission in both RTS 103 and DATA 104 frames sent by the source; and 8. When there is no relay to cooperate with, the source and destination modifying a "reserved time duration" in their DATA 104 and ACK 204 frames accordingly in order to release an unused channel time.

The benefits of using the proposed approach include:

The partner selection could be conducted on a frame-by-frame basis and thus is suitable for wireless networks with dynamic topologies;

The partner selection is made by the intermediate relays, which by nature have better (and possibly, more) information to make a better selection;

The partner selection is achieved in a fully distributed manner, thus reducing potential signaling overheads; and The advantages of using a busy tone are two fold:
  1. It helps the source to determine whether or not a relay is willing to cooperate in less than two time slots, thus reducing signaling overhead and
  2. It reduces the collision probability between the relays with different "rates".

Figure 5:
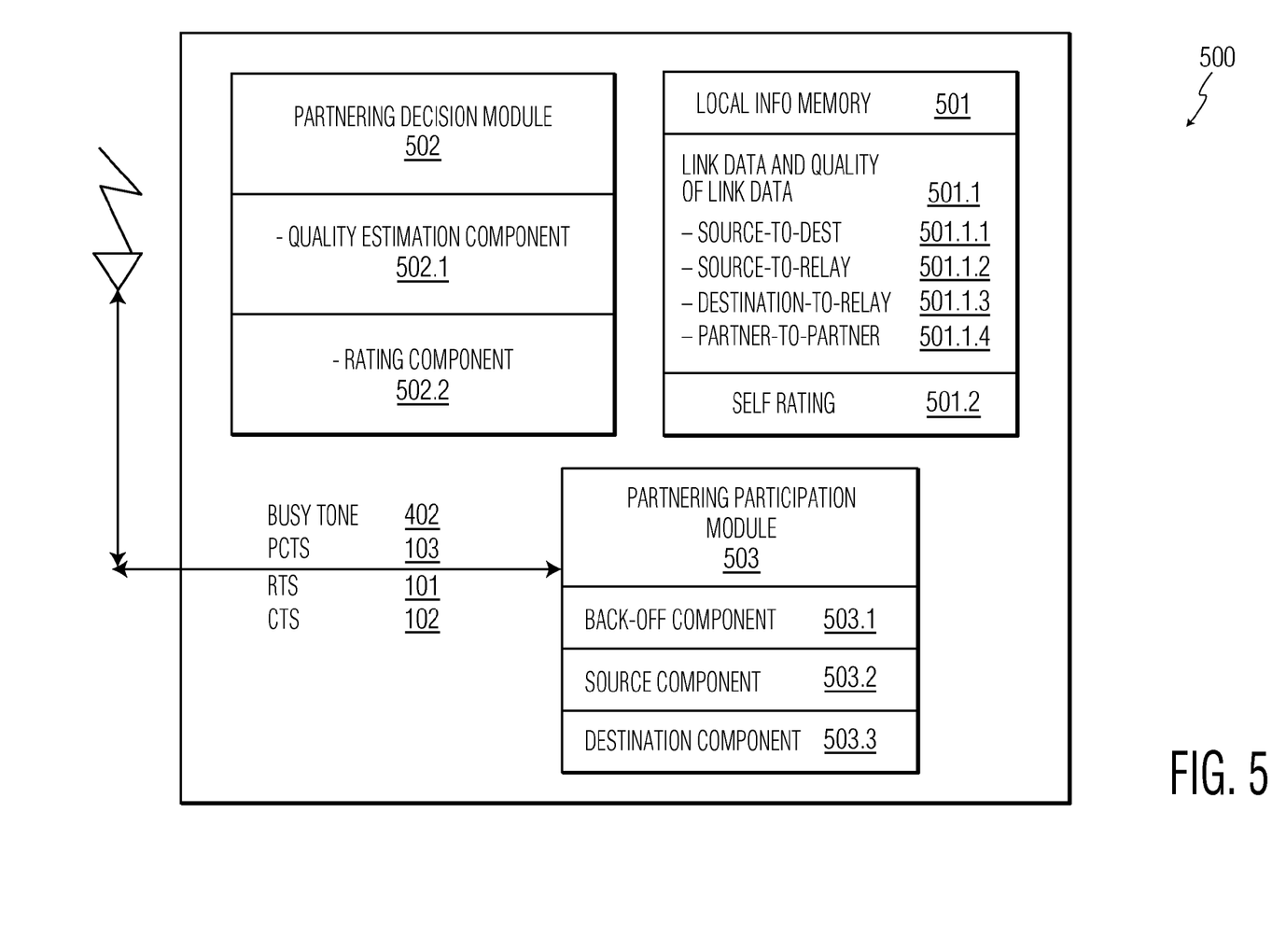
FIG. 5 illustrates a CMAC device, modified according to the present invention.

FIG. 5 illustrates a device 500 modified according to the present invention to perform cooperative wireless communication. Each device that participates in an ad hoc network performs source, destination and partner cooperation functions. The cooperative device comprises a partnering decision module 502, a local information memory 501, and a partnering participation module 503.

In a cooperative MAC protocol, a device 500 can be considered to be in at least one mode selected from the group consisting of non-cooperative source/destination, cooperative source/destination (i.e., cooperative transmission or reception), and cooperative partner, (self-evaluation as a partner and relaying information). The cooperative mode can be with respect to at least one source-destination pair of other devices. A device can be a source seeking cooperation from a partner with respect to a destination now and later act as a cooperative partner for another source-destination pair. However many mode combinations are possible, the present invention only provides a system, apparatus and method for a device (candidate partner) 500 to perform self-evaluation and on the basis of this self-evaluation contend for becoming a cooperative partner, rather than a source making a decision without the candidate partner's consent/knowledge. FIG. 5 illustrates a device 500 modified to perform self-evaluation and to contend for being a partner based on this self-evaluation. It is assumed that other communication modes, such as those others suggested above, are already supported by a CMAC protocol.

With this focus in mind, a device 500 is modified to perform automatic partner selection according to the present invention by configuring the device to include: a partnering decision module 502 comprising a quality estimation component 502.1 that performs a self-evaluation of the device as a partner for a given pair of requesting source (the source having send an RTS 101) and the destination having sent a CTS 102. In order to make this evaluation and produce a self rating 501.2 stored in the local information memory 501 by the rating component 502.2 of the quality partnering decision module, the device 500 listens to transmissions and stores link data 501.1 in the local info memory 501. This link data includes link information for links such as source-to-dest 501.1.1, source-to-relay 501.1.2, destination-to-relay 501.1.3, and partner-to-partner 501.1.4.

The device 500 further comprises a partnering participation module 503 that decides whether or not to become a partner for a requesting source-destination pair and that contends for becoming a partner, and includes a back-off component for use when contending to become a partner. The partnering participation module 503 also includes a source component 503.2 for a device 500 to act as a source that is seeking a partner, i.e., sending an RTS 101 that includes a request for a partner, and a destination component 503.3 for the device to act as a destination, i.e., sending a CTS 102 back to a source that is seeking a partner in cooperatively communicating with the destination.

Figure 6:
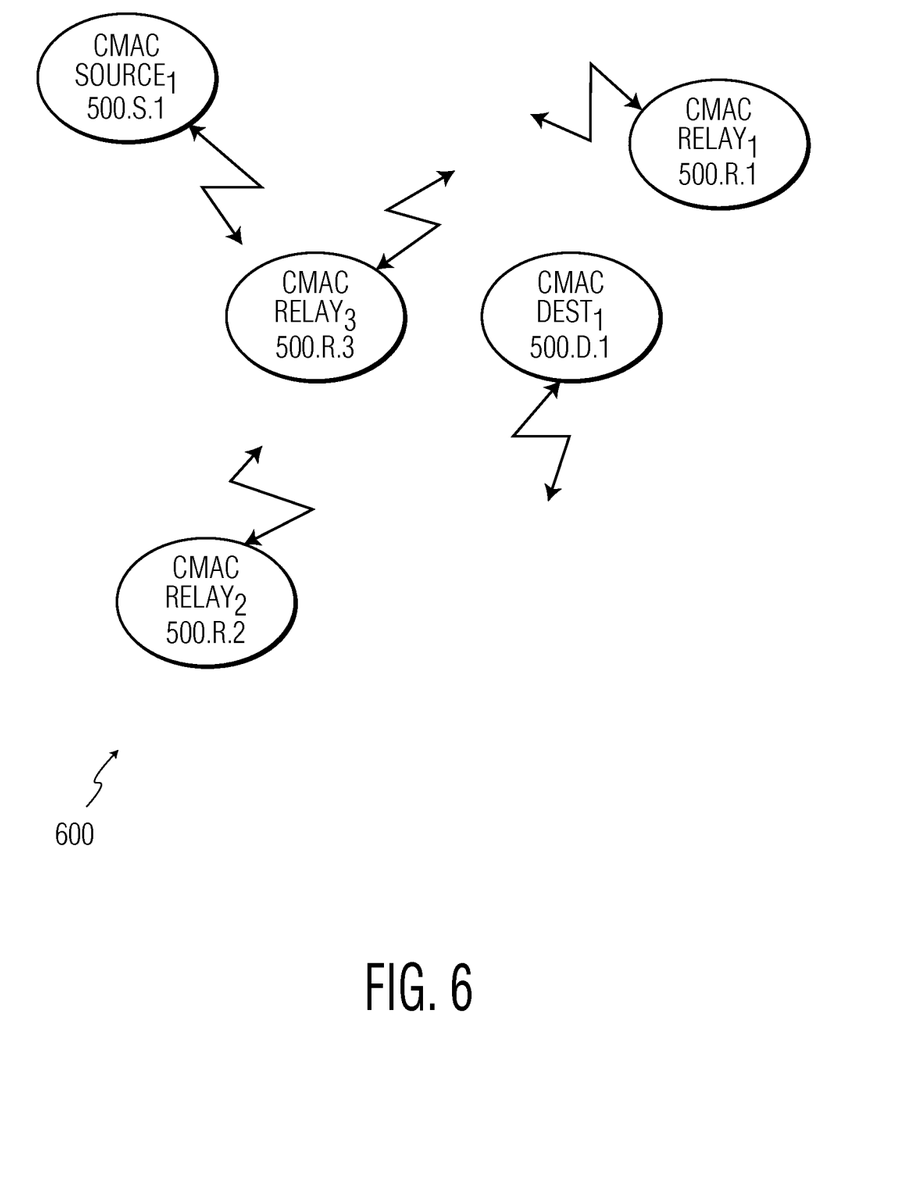
FIG. 6 illustrates a CMAC communication system, according to the present invention.

FIG. 6 illustrates a communication system wherein at least one relay device 500 (i.e., 500.R.3) is a CMAC partner device according to the present invention.

The benefits of using the proposed approach include:

The partner selection is conducted on a frame-by-frame basis, thus is suitable for wireless networks with dynamic topologies;

The partner selection is made by the intermediate relays 500.R.k, which by nature have better (and possibly, more) information to make a better selection;

The partner selection is achieved in a fully distributed manner, thus reducing potential signaling overheads; and The advantages of using a busy tone are two fold:
  1. It helps the source to determine within two times slots whether or not a relay is willing to cooperate, and
  2. It reduces the collision probability between relays having different "rates".

While the preferred embodiments of the present invention have been illustrated and described, it will be understood by those skilled in the art that the embodiment of the present invention as described herein are illustrative and various changes and modifications may be made and equivalents may be substituted for elements thereof without departing from the true scope of the present invention. In addition, many modifications may be made to adapt the teachings of the present invention to a particular situation without departing from its central scope. Therefore, it is intended that the present invention not be limited to the particular embodiments disclosed as the best mode contemplated for carrying out the present invention, but that the present invention include all embodiments falling within the scope of the claims appended hereto as well as all implementation techniques.

We claim:

1. A cooperative wireless communication system, comprising:
    a cooperative Media Access Control (CMAC) protocol comprising:
        a forward error control (FEC) for each frame transmitted, and
        a request-to-send (RTS), clear-to-send (CTS) and a partner-clear-to-send (PCTS) RTS/CTS/PCTS handshaking procedure for a source device and a destination device of said source to request cooperation from relay/partner device such that only a relay/partner device that receives both an RTS transmitted by the source device and a CTS transmitted by the destination device decides based on a self rating whether or not to cooperate as a partner with the source and destination to transmit information therebetween; and
    a plurality of devices configured to employ the CMAC protocol such that each device can be any of a source, a destination and a relay/partner and combination thereof, wherein a relay/partner device of said plurality further comprises:
        a local memory that stores link data received in a CTS frame and an RTS frame, and self rating data;
        a partnering decision module that includes:
            a quality estimation component to estimate and store the quality of links as said link data based on said link data, and
            a rating component to rate and store the self rating of the relay/partner device as a candidate relay/partner for relaying transmissions between the source and the destination based on said link data
        a partnering participation module to self-select, when said self rating is one of a predetermined selection set of ratings, to cooperate as a partner with the source and destination to transmit information therebetween.

2. The system of claim 1, wherein said partnering participation module is further configured to include:
    a source component to be executed for control of the relay/partner device as a source device; and
    a destination component to be executed for control of the relay/partner device as a destination device.

3. The system of claim 1, wherein when there is no candidate relay/partner device that self-selects, the source and the destination modify a "reserved time duration" in their respective DATA and ACK frames, wherein an unused channel time is thereby released.

4. The system of claim 1, wherein when said candidate relay/partner device self-selects as a partner said partner transmits a busy tone for a duration based on the self rating and then said partner contends for transmission of a PCTS frame to indicate willingness to act as a relay between said source and destination, wherein only a self-selected partner that does not hear the at least one busy tone contends for transmitting the PCTS frame and to avoid collision between contending self-selected partners, each self-selected partner that does not hear the at least one busy tone executes a backoff component of the partnering participation module to wait a backoff time randomly selected from 1 through a pre-determined integer N idle slots before transmitting the PCTS frame.

5. The system of claim 4, wherein said self-rating is a rating selected from the group consisting of excellent, good, and bad, said pre-determined selection set of ratings is the group consisting of excellent and good, having a corresponding busy tone transmitted for two slots and one slot.

6. The system of claim 5, wherein the source is further configured to include a source component such that the source executes the source component to proceed as follows:
    if the source component does not hear a busy tone SIFS (short inter frame space) +one slot time after a reception of a CTS frame, the source component conducts transmission as in a non-cooperative scenario based on an assumption that there is no partner;
    if the source component correctly receives a PCTS frame after at least one busy tone the source component conducts transmission by cooperating with the self-selected relay/partner as a partner thereof;
    if the source component receives a PCTS frame with errors from the self-selected partner after at least one busy tone the source component conducts transmission as in a non-cooperative scenario and indicates no need for cooperation in a DATA Frame subsequently transmitted by the source component; and
    the self-selected partner only subsequently participates as a partner if the self-selected partner receives both an RTS frame and a DATA frame indicating the need for cooperation from the source.

7. A method for cooperating in a wireless communication system, comprising:
    providing a cooperative Media Access Control (CMAC) protocol comprising:
        including a forward error control (FEC) for each DATA frame transmitted, and
        providing a request-to-send (RTS), clear-to-send (CTS) and a partner-clear-to-send (PCTS) RTS/CTS/PCTS handshaking procedure for a source device and a destination device of said source said handshaking procedure comprising:
            requesting cooperation from a relay/partner device in both an RTS transmitted by the source device and a CTS transmitted by the destination device;
            a relay/partner device that receives both the transmitted RTS and the transmitted CTS deciding based on a self rating whether or not to cooperate as a partner with the source and destination to transmit information therebetween; and
        providing a plurality of devices configured to employ the CMAC protocol such that each device can be any of a source, a destination, a relay/partner and combinations thereof,
    the method further comprising providing each device of said plurality with:
        a local memory for storing of a link data received in the CTS frame and the RTS frame, and self rating data generated by said relay/partner device;
        a partnering decision module that includes:
            a quality estimation component for performing estimating and storing the quality of links as said link data and
            a rating component for performing self rating and storing the self rating in the local memory of the device as a candidate relay/partner for relay of transmissions between the source and the destination based on said link data
        a partnering participation module to perform self-selecting, when said stored self rating is one of a predetermined selection set of ratings, for performing cooperating as a partner with the source and destination by performing transmitting information therebetween.

8. The method of claim 7, wherein said partnering participation module is further configured to perform:

providing a source component to be executed for control of the relay/partner device as a source device; and providing a destination component to be executed for control of the relay/partner device as a destination device.

9. The method of claim 7, wherein when there is no candidate relay/partner device that self-selects, the source and the destination both performing modifying a "reserved time duration" in their respective DATA and ACK frames whereby an unused channel time is released.

10. The method of claim 7, wherein when said candidate relay/partner device self-selects as a partner said partner performs:

first, transmitting a busy tone for a duration based on the self rating;

then contending for transmission of a PCTS frame to indicate willingness to act as a relay between said source and destination, wherein, only a self-selected partner that does not hear the at least one busy tone performs the contending to avoid collision between contending self-selected partners;

each self-selected partner that does not hear the at least one busy tone performs executing a back-off component of the partnering participation module to wait a backoff time randomly selected from 1 through idle slots before transmitting the PCTS frame.

11. The method of claim 10, wherein said self rating is a rating selected from the group consisting of excellent, good, and bad, said pre-determined selection set of ratings is the group consisting of excellent and good, having a corresponding busy tone transmission duration of two slots and one slot determined by said self rating.

12. The method of claim 11, further comprising configuring the source to include a source component to perform:

if the source component does not hear a busy tone SIFS (short inter frame space) +one slot time after a reception of a CTS frame, the source component conducting transmission as in a non-cooperative scenario based on an assumption that there is no partner;

if the source component correctly receives a PCTS frame after at least one busy tone the source component conducting transmission by cooperating with the self-selected relay/partner as a partner thereof;

if the source component receives a PCTS frame with errors from the self-selected partner after at least one busy tone, the source component performing:

conducting transmission as in a non-cooperative scenario, indicating no need for cooperation in the DATA Frame subsequently transmitted by the source component, and the self-selected partner only subsequently participating as a partner if the self-selected partner receives both an RTS frame and a DATA frame indicating the need for cooperation from the source.

13. A device for cooperative wireless communication, comprising:

a cooperative Media Access Control (CMAC) protocol comprising:

a forward error control (FEC) for each frame transmitted, and a request-to-send (RTS), clear-to-send (CTS) and a partner-clear-to-send (PCTS) RTS/CTS/PCTS handshaking procedure for a source device to request cooperation from the device such that only when the device receives both an RTS transmitted by the source device and a CTS transmitted by a destination device of said source device the device decides, based on a self rating, whether or not to cooperate as a partner with the source device and the destination device to transmit information therebetween; and a partnering participation module that employs the CMAC protocol to control the device as any of a source, a destination and a relay/partner and combination thereof, the device further comprising:

a local memory that stores link data received in a CTS frame and an RTS frame, and self rating data;

a partnering decision module that includes:

a quality estimation component to estimate and store the quality of link data based on said link data, and a rating component to self rate the device and store the self rating as a candidate relay/partner for relaying transmissions between the source and the destination based on said link data, quality of link data; and a partnering participation module to self-select the device, when said self rating is one of a predetermined selection set of ratings, to cooperate as a partner with the source and destination to transmit information therebetween.

14. The device of claim 13, wherein said partnering participation module is further configured to include:

a source component to be executed for control of the device as a source device; and a destination component to be executed for control of the device as a destination device.

15. The device of claim 1, wherein when said device self-selects as a partner and does not hear the at least one busy tone:

said device transmits a busy tone for a duration based on the self rating;

then, to avoid collision between other contending self-selected devices, the device executes a back-off component of the partnering participation module to wait a backoff time randomly selected from 1 through a pre-determined integer N idle slots before transmitting the PCTS frame; and then, the device contends for transmission of a PCTS frame to indicate willingness to act as a relay.

16. The device of claim 15, wherein said self-rating is a rating selected from the group consisting of excellent, good, and bad, said pre-determined selection set of ratings is the group consisting of excellent and good, having a corresponding busy tone transmission duration of two slots and one slot.

17. The device of claim 16, wherein:

the partnering participation module further comprises a source component configured such that when the device is acting as a source device if the source component does not hear a busy tone SIFS (short inter frame space) +one slot time after a reception of a CTS frame from a destination device, the source component conducts transmission as in a non-cooperative scenario based on an assumption that there is no partner device available, and if the source component correctly receives a PCTS frame from a self-selected partner after at least one busy tone the source component conducts transmission by cooperating with the self-selected partner that transmitted the PCTS frame, and if the source component receives a PCTS frame with errors from a self-selected partner after at least one busy tone, the source component conducts transmission as in a non-cooperative scenario and indicates no need for cooperation in DATA Frame subsequently transmitted by the source component; and the device as a self-selected partner only participates as a partner if the device receives both an RTS frame and a DATA frame indicating the need for cooperation from the source.

* * * * *